United States Patent [19]
Christy

[11] Patent Number: 5,970,559
[45] Date of Patent: Oct. 26, 1999

| | | | |
|---|---|---|---|
| [54] | CLEANING TOOL FOR CLEANING A COMPUTER MOUSE | | |
| [76] | Inventor: | Michael Christy, 104 Long Island Dr., Hot Springs, Ark. 71913 | |
| [21] | Appl. No.: | 08/609,655 | |
| [22] | Filed: | Mar. 1, 1996 | |
| [51] | Int. Cl.⁶ | ................................................... B08B 9/00 | |
| [52] | U.S. Cl. | ................... 15/106; 15/104.001; 15/105; 15/118; 15/160; 15/210.1; 15/104.16 | |
| [58] | Field of Search | ................... 15/104.001, 104.03, 15/104.05, 104.16, 104.165, 104.2, 105, 106, 114, 118, 160, 164, 210.1, 211 | |

[56] References Cited

U.S. PATENT DOCUMENTS

| | | | |
|---|---|---|---|
| D. 291,203 | 8/1987 | Silver | D14/114 |
| D. 304,180 | 10/1989 | Gibson | D14/114 |
| D. 305,424 | 1/1990 | Pressley, Sr. | D14/114 |
| D. 331,045 | 11/1992 | Moerke | D14/114 |
| 1,495,008 | 5/1924 | Feagin | 15/104.05 X |
| 4,365,642 | 12/1982 | Costa | 15/105 X |
| 4,703,538 | 11/1987 | Silverstrone | 15/104.001 |
| 4,831,736 | 5/1989 | Bryant, Sr. | 33/1 M |
| 5,418,999 | 5/1995 | Smith | 15/160 X |

FOREIGN PATENT DOCUMENTS

| | | | |
|---|---|---|---|
| 680784 | 9/1939 | Germany | 15/104.16 |
| 454907 | 10/1936 | United Kingdom | 15/104.05 |
| 2268049 | 1/1994 | United Kingdom | 15/104.001 |

OTHER PUBLICATIONS

Radio Shack, Mouse Cleaning Kit Package.

Gemini Industries, Inc., Mousing Cleaning Kit Package.

*Primary Examiner*—Mark Spisich
*Attorney, Agent, or Firm*—Howell & Haferkamp, L.C.

[57] ABSTRACT

A method of cleaning a computer mouse of the type having a ball that spins within a chamber in contact with two horizontal rollers in mutually perpendicular planes. The method includes removing the ball from the chamber, inserting the cylindrical end of a cleaning tool having a pile material thereon axially into the chamber, and moving the end of the tool axially to turn the rollers, and rotating the end the tool about its axis to rub the rollers. The tool of the present invention, which is adapted for use with the method of this invention, includes a cylindrical end having a diameter adapted to be inserted inside the chamber, and a pile covering on the cylindrical end projecting sufficiently from the surface of the end to frictionally engage the rollers so that axial movement of the tool end causes the rollers to turn and rotation of the tool end rubs the rollers.

6 Claims, 1 Drawing Sheet

CLEANING TOOL FOR CLEANING A COMPUTER MOUSE

BACKGROUND AND SUMMARY OF THE INVENTION

A mouse is a widely used computer input device which comprises a ball that spins within a chamber in contact with two horizontal rollers in mutually perpendicular planes. The mouse is moved across the top of the desk, spinning the ball, which in turn causes the rollers to move, moving the cursor on the computer screen. With use the ball and the rollers get dirty, which results in slippage between the ball and rollers, so that the user cannot reliably position the cursor on the computer screen. This is extremely frustrating for the computer user, and can significantly impair productivity. The vast majority of users will eventually simply replace the mouse. A small number of more sophisticated users may attempt to clean the mouse, but this can be difficult and time consuming.

Some attempts have been made to provide a tool for cleaning a computer mouse, for example, Cox, U.S. Pat. No. 5,297,310. However, the problems with existing methods and tools for cleaning a computer mouse are that they are not completely effective at cleaning the entire surface of the roller, and thus there is still slippage after cleaning. Moreover, the presently available methods and tools simply knock the lint, dust and debris from the rollers, leaving it in the chamber where it can reaccumulate on the roller and ball, or interfere with the sensors that measure and transmit the movement of the rollers to the computer. Moreover, the presently available methods and tools often rely upon volatile solvents, which is environmentally undesirable.

The method of the present invention provides a way of quickly and easily cleaning the rollers of a computer mouse of the type having a ball that spins within a chamber in contact with two horizontal rollers in mutually perpendicular planes. The method allows the entire surface of the rollers to be cleaned, and actually cleans both rollers simultaneously. Generally, the method of this invention comprises removing the ball from the chamber, inserting the cylindrical end of a cleaning tool having a pile material thereon axially into the chamber, and moving the end of the tool axially to turn the rollers, and rotating the end of the tool about its axis to rub the rollers. The pile material is preferably the hook portion of a hook and loop type fastening material. The cylindrical tip preferably has a diameter approximating the diameter of the ball, so that the surface of the tip firmly contacts the rollers.

The tool of the present invention is specifically adapted for cleaning a computer mouse in accordance with the method of this invention. Generally, the tool comprises a cylindrical end having a diameter adapted to be inserted inside the chamber, and a pile covering on the cylindrical end projecting sufficiently from the surface of the end to frictionally engage the rollers so that axial movement of the tool end causes the rollers to turn and rotation of the tool end rubs the rollers. The pile material is preferably the hook portion of a hook-and-loop type fastening material. The diameter of the end preferably has a diameter approximating the diameter of the ball so that the surface of end firmly contacts the rollers.

The method of this invention thus provides a quick, simple, and effective way of cleaning the rollers in a computer mouse. Thereby restoring reliable operation. The method removes accumulated lint, dust and debris from the rollers, increasing the time between cleanings, and reducing the chance that these particles will interfere with the operating of the mouse. The method employs a cleaning tool of simple and inexpensive construction. These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

The method of the present invention provides a way to clean a computer mouse, a common computer input device that comprises a ball that spins within a chamber in contact with two horizontal rollers in mutually perpendicular planes. The method of the present invention comprises the steps of removing the ball from the chamber; inserting the cylindrical end of a cleaning tool having a pile material thereon axially into the chamber; and moving the end of the tool axially to turn the rollers, and rotating the end of the tool about its axis to rub the rollers.

Figure 1:
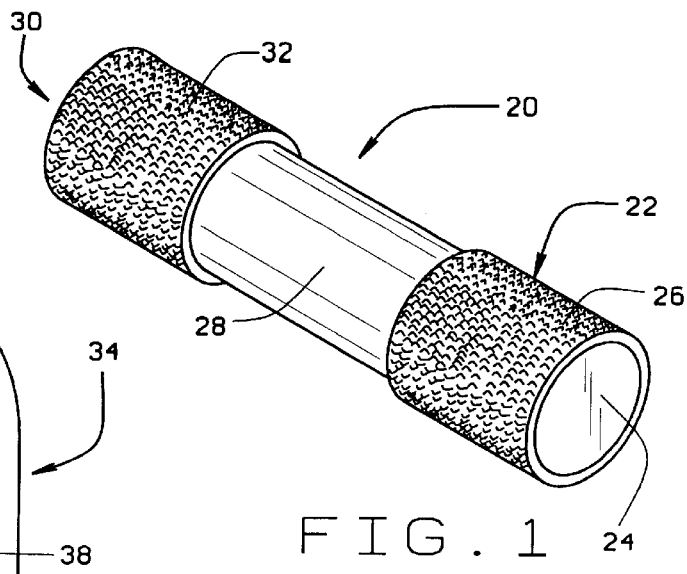
FIG. 1 is a perspective view of a cleaning tool constructed according to the principles of this invention, and used in the method of this invention.
Figure 2:
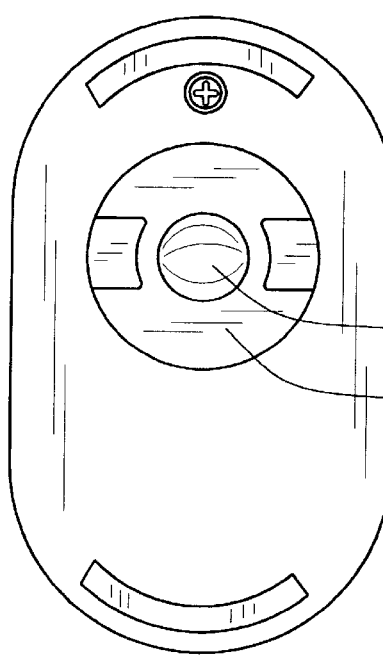
FIG. 2 is a bottom plan view of a computer mouse.
Figure 3:
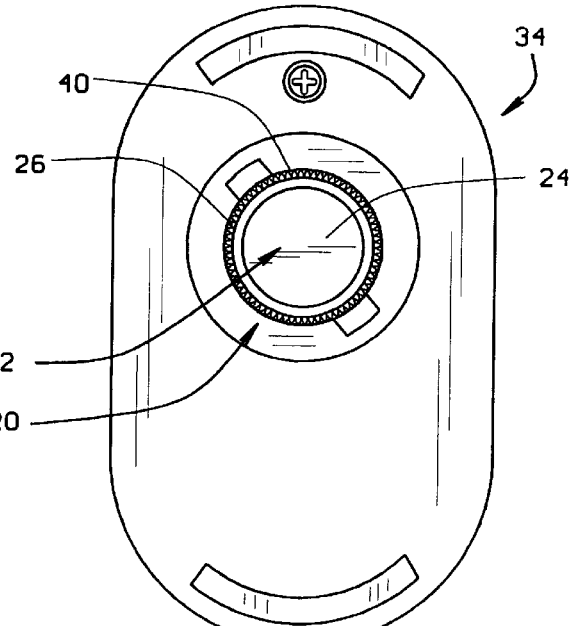
FIG. 3 is a bottom plan view of a mouse with the retainer ring and ball removed, and the end of a cleaning tool inserted into the chamber.
Figure 5:
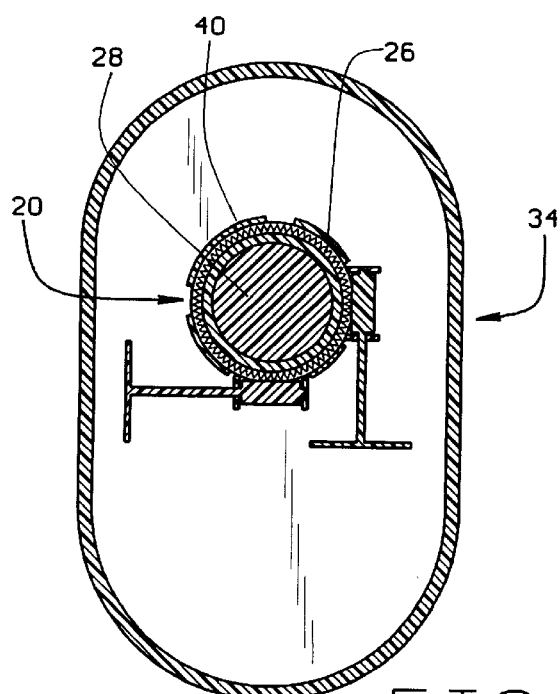
FIG. 5 is a cross-sectional view of the mouse taken along the plane of line 5—5 in FIG. 4.
Figure 4:
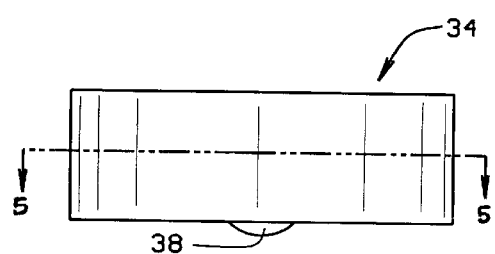
FIG. 4 is an end plan view of the mouse of FIG. 2.

The method is conveniently carried out with a special cleaning tool, which is indicated generally as 20 in FIGS. 1, 3, and 5. The tool 20 has a tip 22 that has a cylindrical surface 24 covered with a pile material 26. The end preferably has a diameter approximating the diameter of the ball so that the surface of the end firmly contacts the rollers. The pile material 26 may be, for example the hook portion of a hook and loop type fastening material such as Velcro®, available from Velcro Industries, B.V., Amsterdam, Netherlands. The hook portion of a hook and loop type fastening materials has been found to be very effective at removing and retaining lint; however, the loop portion of a hook-and-loop type fastening materials has also been found to be effective.

In the preferred embodiment, the tool 20 is a solid cylinder 28. The cylinder is preferably made from an inexpensive, strong but lightweight material such as polyethylene or other material. The material preferably does not react to cleaning solvents that might be used to assist in the cleaning operation, although such solvents generally are not needed with the method and tool of the present invention. The end of the cylinder forms the tip 22, and is wrapped with a rectangular strip of pile material, which may be secured with an adhesive or other means such as ultrasonic welding. The remainder of the cylinder 28 forms a handle by which the tool can be conveniently grasped and manipulated to clean the mouse. The end 30 of the cylinder 28 opposite from the tip 22 can be provided with a second pile material 32, either the same as the pile material 26, but preferably different from the pile material 26 to provide an alternative cleaning surface. For example, if the pile material 26 is the hook portion of a hook-and-loop type fastening material, then the pile material 32 might be the loop portion of the hook-and-loop type fastening material. This provides an alternative if, for some reason, the hook portion is ineffective at cleaning. Also, the loop portion holds solvent better and can be used to apply cleaning solvent to the mouse.

In this preferred embodiment, the cylinder 28 is about 3 inches long (7.62 cm), and has a uniform diameter of about 0.75 inches (1.95 cm). With the pile covering the outside diameter of the tip 22 is therefore about 0.91 inches (2.30 cm) thick. These dimensions have been found to be appropriate for a computer mouse with a 0.87 inch (2.2 cm) diameter ball.

OPERATION

In operation, the mouse 34 is turned over and the retaining ring 36 on the bottom is removed to expose the ball 38 and chamber 40. The ball 38 is then removed from the chamber 40, and the tip 22 of the tool 20 is axially advanced into the chamber 40. The tip 22 simultaneously contacts both of the horizontal rollers. Axial movement of the tip 22 causes each of the rollers to turn on its respective axis. Rotation of the tip 22 causes the surface of the tip to wipe the surface of each of the rollers. Thus by moving the tip axially and simultaneously turning the tip about its axis, the tool can clean the entire surfaces of both rollers simultaneously.

What is claimed:

1. A cleaning tool for cleaning a computer mouse of the type having a ball that spins within a chamber in contact with two horizontal rollers in mutually perpendicular planes, the tool comprising:

a first cylindrical end having a diameter adapted to be inserted inside the chamber, and a pile covering on the cylindrical end projecting sufficiently from the surface of the end to frictionally engage the rollers so that axial movement of the tool end causes the rollers to turn and rotation of the tool end rubs the rollers; and a second cylindrical end having a diameter adapted to be inserted inside the chamber, and a pile covering on the second cylindrical end projecting sufficiently from the surface of the second end to frictionally engage the rollers, so that axial movement of the tool end causes the rollers to turn and rotation of the tool end rubs the rollers.

2. The cleaning tool according to claim 1 wherein the pile material on the first cylindrical end is different from the pile material on the second cylindrical end.

3. The cleaning tool according to claim 2 wherein the pile material on the first cylindrical end is the hook portion of a hook and loop type fastening material and the pile material on the second end is the loop portion of a hook and loop type fastening material.

4. A cleaning tool for cleaning a computer mouse of the type having a ball that spins within a chamber in contact with two horizontal rollers with mutually perpendicular axes, the tool comprising:

a rod having first and second cylindrical ends at opposite ends of the rod, each end having a diameter adapted to be inserted inside the chamber, and a pile covering on each cylindrical end projecting sufficiently outwardly from the surface of the end to frictionally engage the rollers, so that axial movement of the tool end causes the rollers to turn and rotation of the tool end rubs the rollers.

5. The cleaning tool according to claim 4 wherein the pile material on the first cylindrical end is different from the pile material on the second cylindrical end.

6. A cleaning tool for cleaning a computer mouse of the type having a ball that spins within a chamber in contact with two horizontal rollers with mutually perpendicular axes, the tool comprising:

a rod having first and second cylindrical ends at opposite ends of the rod, each end having a diameter adapted to be inserted inside the chamber, and a pile covering on each cylindrical end projecting sufficiently outwardly from the surface of the end to frictionally engage the rollers, so that axial movement of the tool end causes the rollers to turn and rotation of the tool end rubs the rollers, the pile material on the first cylindrical end being different from the pile material on the second cylindrical end, the pile material on the first cylindrical end being the hook portion of a hook and loop type fastening material and the pile material on the second end being the loop portion of a hook and loop type fastening material.

* * * * *